United States Patent
Okada (10) Patent No.: US 9,307,116 B2
(45) Date of Patent: *Apr. 5, 2016

(54) IMAGE READER

(71) Applicant: BROTHER KOGYO KABUSHIKI KAISHA, Nagoya, Aichi (JP)

(72) Inventor: Hidekazu Okada, Hashima (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/273,786

(22) Filed: May 9, 2014

(65) Prior Publication Data

US 2014/0240791 A1    Aug. 28, 2014

Related U.S. Application Data

(63) Continuation of application No. 13/075,802, filed on Mar. 30, 2011, now Pat. No. 8,724,180.

(30) Foreign Application Priority Data

Mar. 31, 2010   (JP) ................. 2010-081544

(51) Int. Cl.
   *H04N 1/04*       (2006.01)
   *H04N 1/40*       (2006.01)
   (Continued)

(52) U.S. Cl.
   CPC ............. *H04N 1/40* (2013.01); *H04N 1/00954* (2013.01); *H04N 1/121* (2013.01); *H04N 1/19* (2013.01);
   (Continued)

(58) Field of Classification Search
   CPC ..... H04N 1/40; H04N 1/00954; H04N 1/121; H04N 1/19; H04N 1/193; H04N 1/2032; H04N 2201/0081; H04N 2201/0454
   See application file for complete search history.

(56) References Cited

U.S. PATENT DOCUMENTS 7,123,390 B2    10/2006  Sato
7,518,763 B2 *   4/2009  Shiraishi et al. .............. 358/475
(Continued)

FOREIGN PATENT DOCUMENTS

JP   2003-110807    4/2003
JP   2003-309703    10/2003
(Continued)

OTHER PUBLICATIONS

Official Action dated May 14, 2013 from related U.S. Appl. No. 13/075,802.

(Continued)

*Primary Examiner* — Cheukfan Lee
(74) *Attorney, Agent, or Firm* — Scully, Scott, Murphy & Presser, P.C.

(57) ABSTRACT

An image reader is provided, which includes a first analog front end unit configured to perform A/D conversion for analog signals that are output via a first group of channels of a number resulting from rounding up, to a closest whole number, an average value between a number of at least one channel for a first image reading unit and a number of channels for a second image reading unit, among analog signals output from the first image reading unit and the second image reading unit, and a second analog front end unit configured to perform A/D conversion for analog signals that are output via a second group of channels other than the channels in the first group, among the analog signals output from the first image reading unit and the second image reading unit.

9 Claims, 5 Drawing Sheets

(51) Int. Cl.
*H04N 1/00* (2006.01)
*H04N 1/12* (2006.01)
*H04N 1/193* (2006.01)
*H04N 1/203* (2006.01)
*H04N 1/19* (2006.01)

(52) U.S. Cl.
CPC ............. *H04N 1/193* (2013.01); *H04N 1/2032* (2013.01); *H04N 2201/0081* (2013.01); *H04N 2201/0454* (2013.01)

(56) References Cited

U.S. PATENT DOCUMENTS

| | | | |
|---|---|---|---|
| 7,626,735 B2 * | 12/2009 | Mizuhashi et al. | 358/474 |
| 2003/0063332 A1 | 4/2003 | Sato | |
| 2005/0057783 A1 * | 3/2005 | Kasuga et al. | 358/446 |
| 2006/0209336 A1 | 9/2006 | Nishimura | |
| 2011/0211236 A1 | 9/2011 | Nagasaka | |
| 2012/0218610 A1 | 8/2012 | Kunii | |
| 2013/0003148 A1 | 1/2013 | Kani | |

FOREIGN PATENT DOCUMENTS

| | | |
|---|---|---|
| JP | 2003-315935 | 11/2003 |
| JP | 2006-197655 | 7/2006 |
| JP | 2006-261803 | 9/2006 |
| JP | 2007-281718 | 10/2007 |
| JP | 2008-85600 | 4/2008 |

OTHER PUBLICATIONS

Notice of Allowance dated Jan. 2, 2014 from related U.S. Appl. No. 13/075,802.

\* cited by examiner

IMAGE READER

CROSS-REFERENCE TO RELATED APPLICATION

This application is a continuation application of U.S. patent application Ser. No. 13/075,802 dated Mar. 30, 2011 and claims priority under 35 U.S.C. §119 from Japanese Patent Application No. 2010-081544 filed on Mar. 31, 2010. The entire subject matter of each of which are incorporated herein by reference.

BACKGROUND

1. Technical Field

The following description relates to one or more image readers configured to read an image of a document sheet, particularly to one or more image readers that has a first image reading unit configured to read an image on a first side of a document sheet being conveyed along a feeding path and output an analog signal corresponding to the read image of the first side, and a second image reading unit configured to read an image on a second side of the document sheet being conveyed along the feeding path and output an analog signal corresponding to the read image of the second side.

2. Related Art

So far, an image reader configured to read an image of a document sheet has been applied to various devices such as an image scanner, a copy machine, and a facsimile machine. To attain a function of the image reader of this kind to read images on both sides of a document sheet, an image reader has been proposed that has a single image reading unit configured to read the images on the both sides of the document sheet by reversing the document sheet on an improved feeding path. In addition, recently, an image reader has been proposed that is configured to read images on both sides of a document sheet together using two image reading units.

For example, in an image reader which has a first image reading unit configured to read an image on a first side of a document sheet being conveyed along a feeding path and output an analog signal corresponding to the read image of the first side, and a second image reading unit configured to read an image on a second side of the document sheet being conveyed along the feeding path and output an analog signal corresponding to the read image of the second side, it is possible to perform, in parallel, an operation of reading the image on the first side using the first image reading unit and an operation of reading the image on the second side using the second image reading unit. Thus, it is possible to enhance a reading speed for reading the both sides of the document sheet. Further, in the image reader of this kind, the first image reading unit and the second image reading unit are connected with respective separate analog front ends (AFEs) such that the analog signal output from each image reading unit is individually converted into a digital signal.

SUMMARY

As the first and second reading units, a device may be applied that is provided with a plurality of light receiving elements in a main scanning direction and configured to read an image of a document sheet through the light receiving elements and output analog signals output sequentially from the light receiving elements. In this case, the light receiving elements may be grouped in association with a plurality of channels such that the analog signal sequentially output from each light receiving element is output through a corresponding one of the channels. Thereby, it is possible to promptly complete output of the analog signals.

However, reading speeds required for the first reading unit and the second reading unit may be different from each other. For instance, there may be a case where three channels are assigned to the first reading unit and one channel is assigned to the second reading unit. In this case, it is assumed that the aforementioned configuration, in which the first image reading unit and the second image reading unit are connected with the respective separate AFEs, is applied. Under the assumption, a first AFE configured to perform A/D conversion for the analog signals from the first image reading unit may receive analog signals three times as many as analog signals that are input to a second AFE configured to perform A/D conversion for the analog signals from the second image reading unit. In such a situation, since each AFE has a limited A/D conversion speed, the second AFE is required to adjust the A/D conversion speed thereof in conformity to the A/D conversion speed of the first AFE, and thus cannot fully exert its function.

Aspects of the present invention are advantageous to provide one or more improved techniques for an image reader which has a first image reading unit configured to read an image on a first side of a document sheet being conveyed along a feeding path and output an analog signal corresponding to the read image of the first side and a second image reading unit configured to read an image on a second side of the document sheet being conveyed along the feeding path and output an analog signal corresponding to the read image of the second side, which techniques make it possible to enhance an A/D conversion velocity in A/D conversion of the analog signals by using, in an adequately balanced manner, respective analog front ends (AFEs) of the first and second reading units that perform A/D conversion for the analog signals from the first and second reading units.

According to aspects of the present invention, an image reader is provided, which includes a first image reading unit including a plurality of first light receiving elements each of which is assigned to one of at least one channel, the first image reading unit being configured to read an image on a first side of a first document sheet being conveyed along a feeding path with the first light receiving elements, and output an analog signal output from each of the first light receiving elements, via a corresponding one of the at least one channel to which each of the first light receiving elements is assigned, a second image reading unit including a plurality of second light receiving elements each of which is assigned to one of channels which are at least two more than the at least one channel for the first image reading unit, the second image reading unit being configured to read an image on a second side of the first document sheet being conveyed along the feeding path with the second light receiving elements, and output an analog signal output from each of the second light receiving elements, via a corresponding one of the channels to which each of the second light receiving elements is assigned, a first analog front end unit configured to perform A/D conversion for analog signals that are output via a first group of channels of a number resulting from rounding up, to a closest whole number, an average value between a number of the at least one channel for the first image reading unit and a number of the channels for the second image reading unit, among the analog signals output from the first image reading unit and the second image reading unit, and a second analog front end unit configured to perform A/D conversion for analog signals that are output via a second group of channels other than the channels in the first group, among the analog signals output from the first image reading unit and the second image reading unit.

According to aspects of the present invention, further provided is an image reader that includes a first image reading unit including a plurality of first light receiving elements assigned to one channel for the first image reading unit, the first image reading unit being configured to read an image on a first side of a document sheet being conveyed along a feeding path with the first light receiving elements, and output an analog signal output from each of the first light receiving elements, via the channel, a second image reading unit including a plurality of second light receiving elements each of which is assigned to one of three channels for the second image reading unit, the second image reading unit being configured to read an image on a second side of the document sheet being conveyed along the feeding path with the second light receiving elements, and output an analog signal output from each of the second light receiving elements, via a corresponding one of the three channels to which each of the second light receiving elements is assigned, a first analog front end unit configured to perform A/D conversion for analog signals that are output via a first group of two channels selected from the one channel for the first image reading unit and the three channels for the second image reading unit, among the analog signals output from the first image reading unit and the second image reading unit, and a second analog front end unit configured to perform A/D conversion for analog signals that are output via a second group of two channels other than the two channels in the first group, among the analog signals output from the first image reading unit and the second image reading unit.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

[Overall Configuration of Image Reader]

Figure 1:
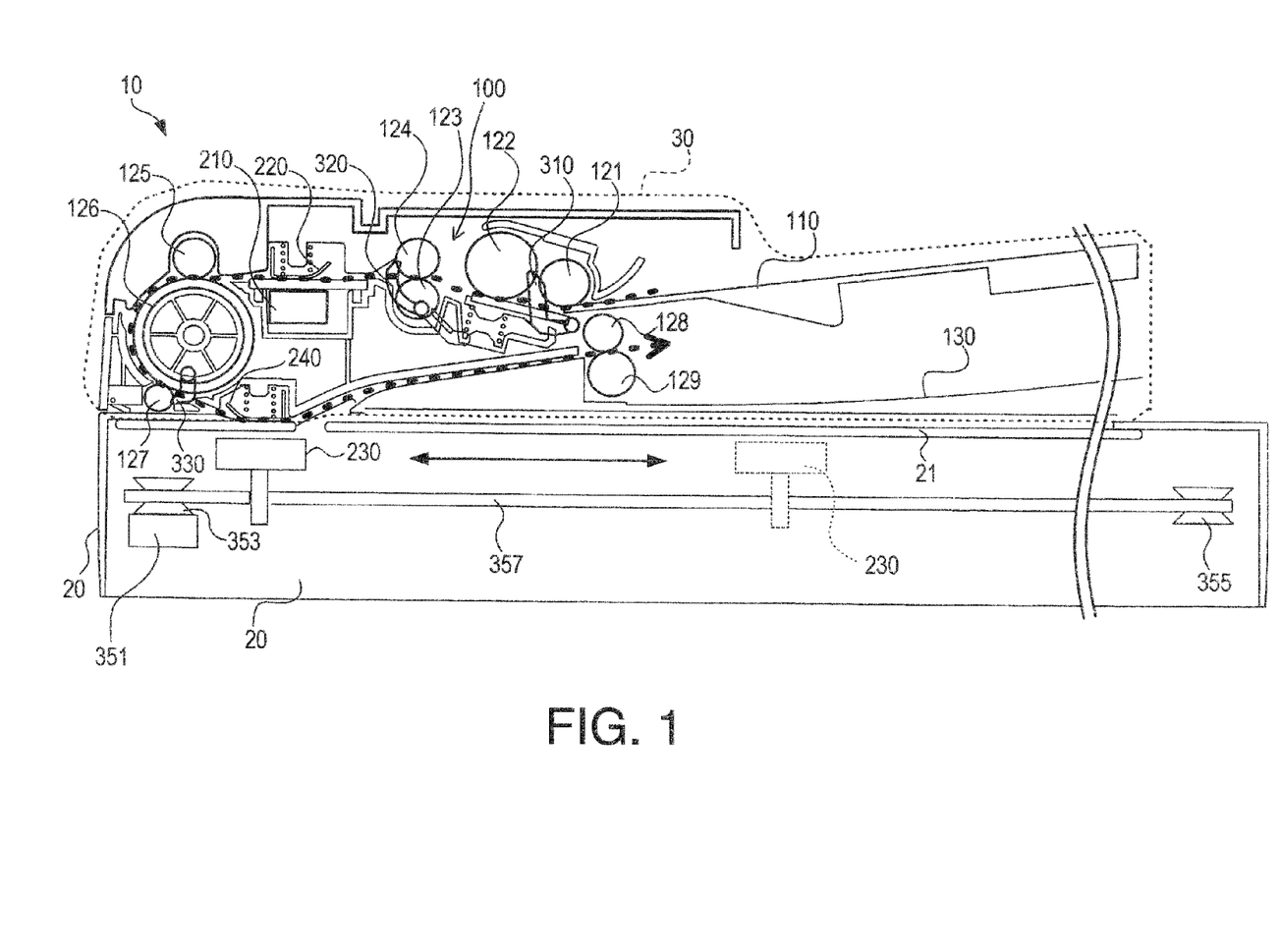
FIG. 1 is a cross-sectional view schematically showing a configuration of an image reader in an embodiment according to one or more aspects of the present invention.

Hereinafter, an embodiment according to aspects of the present invention will be described with reference to the accompany drawings. FIG. 1 is a cross-sectional view schematically showing a configuration of an image reader 10 in the embodiment. It is noted that the image reader 10 is disposed above a base body 20 of a multi-function peripheral (MFP) that includes an image forming unit (not shown). Further, a document cover 30 is provided above the base body 20 in an openable and closable manner.

As illustrated in FIG. 1, there is a glass document table 21 provided on an upper end face of the base body 20. The document table 21 is configured such that a document sheet (not shown) is placed thereon when an image reader 10 of the embodiment is used as a flatbed scanner. The document cover 30 is attached to a side of the upper end face of the base body 20 in an openable and closable manner so as to, when closed, cover the document sheet placed on the document table 21.

Further, the document cover 30 is provided with an automatic document feeder (ADF). Specifically, the document cover 30 includes a feeding unit 100 that serves as the ADF to feed the document sheet placed on a feed tray 110 along a feeding path, and a first-side contact image sensor (CIS) 210 that is one of two CISs 210 and 230 configured to read in parallel both a first side and a second side of the document sheet being conveyed on a feeding path. It is noted that the other one of the two CISs 210 and 230, i.e., the second-side CIS 230 is provided in the base body 20.

Figure 2:
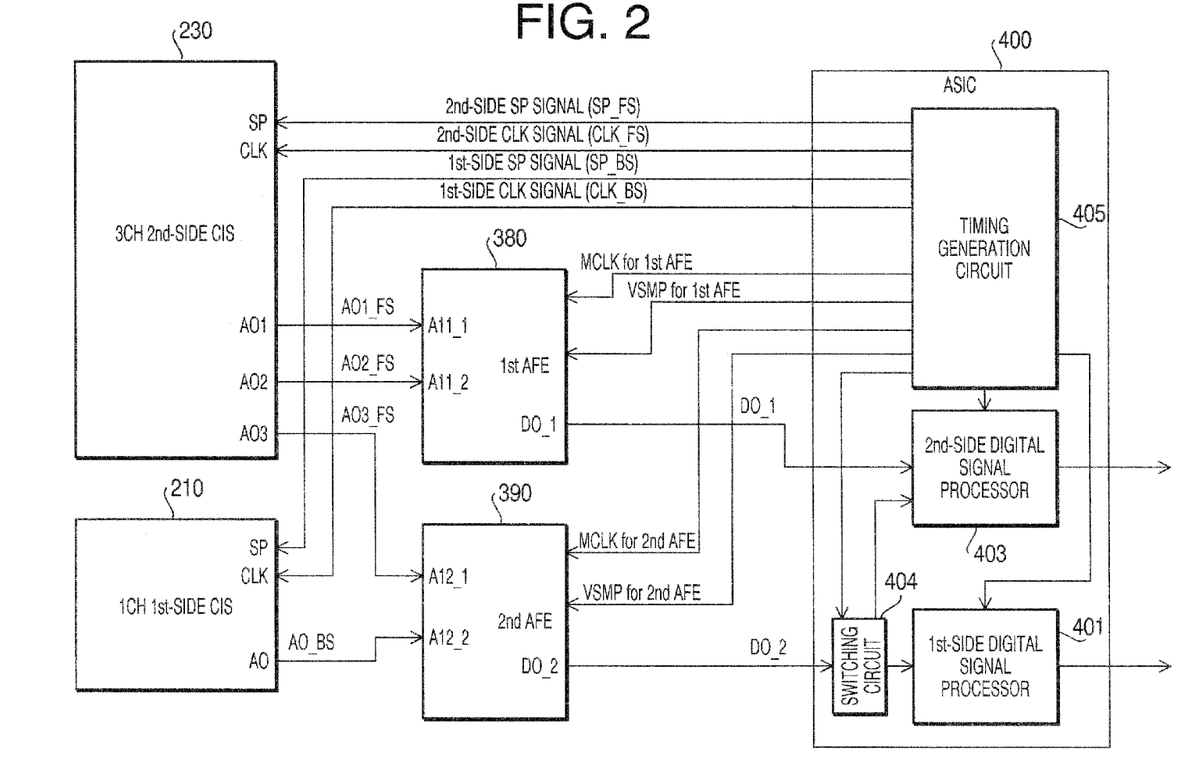
FIG. 2 is a block diagram showing a configuration of a control system of the image reader in the embodiment according to one or more aspects of the present invention.

The feeding unit 100 includes feed rollers 121 to 129 configured to feed the document sheet placed on the feed tray 110 to a catch tray 130 along the feeding path (see a thick dashed line in FIG. 2). Additionally, on the feeding path, there are provided an upstream reading position and a downstream reading position. In this case, the first-side CIS 210 for reading an image on the first side of the document sheet is disposed in a location corresponding to the upstream reading position. It is noted that the first side denotes a down-facing side of the document sheet in the state placed on the feed tray 110. Further, a first pressing member 220 is disposed on the feeding path to press the document sheet passing through the upstream reading position against a reading surface of the first-side CIS 210. In addition, the second-side CIS 230 for reading an image on the second side (opposite to the first side) of the document sheet is movably provided in a location, beneath the document table 21, which corresponds to the downstream reading position. Furthermore, a second pressing member 240 is disposed on the feeding path to press the document sheet passing through the downstream reading position against a reading surface of the second-side CIS 230.

Further, on the feeding path, an F sensor 310, an RB sensor 320, and an R sensor 330 are disposed as sensors to detect presence/absence of the document sheet being conveyed on respective detection positions. The second-side CIS 230 is fixed to an endless belt 357 wound around a pair of a driving pulley 353 driven by a motor 351 to rotate and a driven pulley 355. Thereby, the second-side CIS 230 is configured to, in response to rotation of the motor 351, move in an auxiliary scanning direction (i.e., a left-to-right direction in FIG. 1) under the document table 21.

[Configuration of Control System of Image Reader]

As shown in FIG. 2, the second-side CIS 230 is a three-channel CIS configured to, when a second-side SP signal (SP_FS) is input thereto, output analog signals AO1_FS, AO2_FS, and AO3_FS that correspond to a line of image in the main scanning direction via three terminals AO1, AO2, and AO3, respectively, in synchronization with a second-side CLK signal (CLK_FS). Meanwhile, the first-side CIS 210 is a one-channel CIS configured to, when a first-side SP signal (SP_BS) is input thereto, output analog signals AO_BS corresponding to a line of image in the main scanning direction via a terminal AO in synchronization with a first-side CLK signal (CLK_BS). It is noted that a detailed explanation about the second-side CIS 230 will be provided later.

The analog signals AO1_FS and AO2_FS output from the second-side CIS 230 are input to terminals AI1_1 and AI1_2 of a first analog front end (AFE) 380, respectively. Further, the analog signal AO3_FS output from the second-side CIS 230 is input to a terminal AI2_1 of a second AFE 390.

Figure 3A:
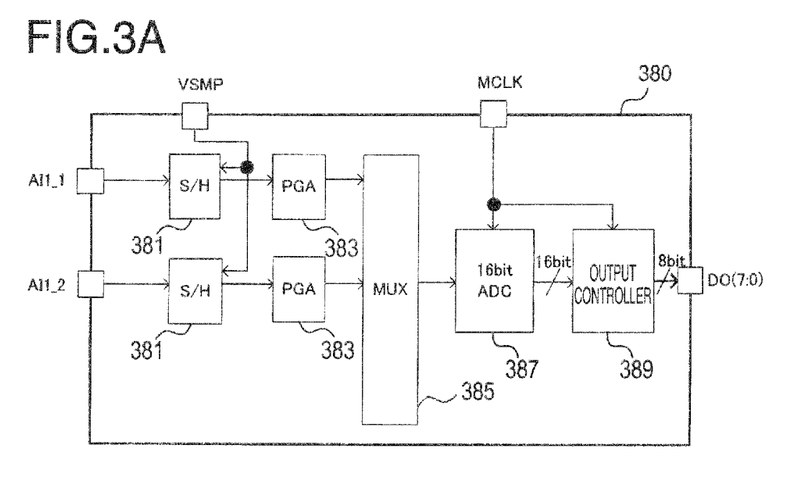
FIG. 3A is a block diagram showing a detailed configuration of one of analog front ends (AFEs) of the control system in the embodiment according to one or more aspects of the present invention.

The AFEs 380 and 390 are configured in a below-mentioned manner. The first AFE 380 sequentially converts two-channel signals input to the terminals AI1_1 and AI1_2 into a digital signal DO_1, and outputs the digital signal DO_1. The second AFE 390 sequentially converts two-channel signals input to the terminals AI2_1 and AI2_2 into a digital signal DO_2, and outputs the digital signal DO_2. FIG. 3A is a block diagram showing a detailed configuration of the first AFE 380. It is noted that the second AFE 390 is configured in the same manner as depicted in FIG. 3A.

As shown in FIG. 3A, the first AFE 380 includes two sample/hold circuits (S/H) 381 provided respectively for the terminals AI1_1 and AI1_2, and two programmable gain amplifiers (PGAs) 383 provided respectively for the terminals AI1_1 and AI1_2. Further, the first AFE 380 includes a multiplexer (MUX) 385, an A/D converter (ADC) 387, and an output controller 389 that are provided as common elements between the terminals AI1_1 and AI1_2. Each analog signal input to the terminals AI1_1 and AI1_2 has a waveform of a wave delayed with a predetermined time constant due to some effects such as an effect resulting from amplification by an amplifier incorporated in the second-side CIS 230, as exemplified with "AI1_1, AI1_2, AI2_1, AI2_2" in FIG. 3B. The two sample/hold circuits 381 acquires separate values (analog values) of the analog signals input into the terminals AI1_1 and AI1_2, in synchronization with a first sampling timing signal (VSMP for 1st AFE in FIG. 2). The first sampling timing signal is input to a terminal VSMP at such a moment that each sample/hold circuit 381 can acquire a value showing a light intensity of received light for each pixel in the most adequate manner, near a peak of the waveform of the analog signal.

The analog values acquired in the above manner are input to the multiplexer 385 via the programmable gain amplifiers 383, and transmitted to the A/D converter 387, respectively. The A/D converter 387 converts the analog values (acquired from the analog signals input through the terminals AI1_1 and AI1_2, respectively) into digital values in synchronization with a first A/D conversion main clock signal (MCLK for 1st AFE in FIG. 2) input through a terminal MCLK, and outputs the digital values as digital signals DO_1 through the output controller 389. In the same manner, the second AFE 390 acquires separate analog values from the analog signals input via the terminals AI2_1 and AI2_2 in synchronization with a second sampling timing signal (VSMP for 2nd AFE in FIG. 2). Then, the second AFE 390 converts the acquired analog values into digital values in synchronization with a second A/D conversion main clock signal (MCLK for 2nd AFE in FIG. 2), and outputs the digital values as digital signals DO_2.

Figure 3B:
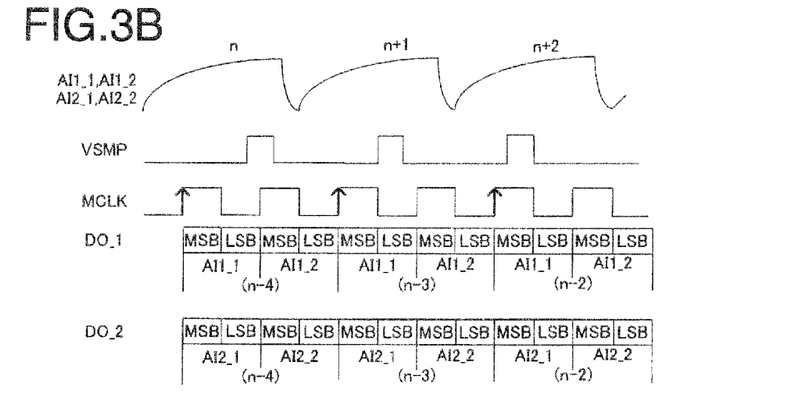
FIG. 3B shows a chart of a signal transmitted via each terminal of the AFE to illustrate an operation of the AFE in the embodiment according to one or more aspects of the present invention.

Here, it is assumed that the first sampling timing signal (VSMP for 1st AFE) and the second sampling timing signal (VSMP for 2nd AFE) are the same sampling timing signals VSMP, and that the first A/D conversion main clock signal (MCLK for 1st AFE) and the second A/D conversion main clock signal (MCLK for 2nd AFE) are the same A/D conversion main clock signals MCLK. FIG. 3B exemplifies the digital signals DO_1 and DO_2 in the above case. As exemplified in FIG. 3B, even though the analog signals are input to the terminals AI1_1, AI1_2, AI2_1, and AI2_2 at the same moment, and the analog values are concurrently acquired in synchronization with the same sampling timing signals VSMP, the digital values, which correspond to the analog signals input via the terminals AI1_1 and AI1_2, are sequentially output as the digital signals DO_1 in synchronization with the A/D conversion main clock signal MCLK. Further, the digital values, which correspond to the analog signals input via the terminals AI2_1 and AI2_2, are sequentially output as the digital signals DO_2 in synchronization with the A/D conversion main clock signal MCLK.

Figure 4A:
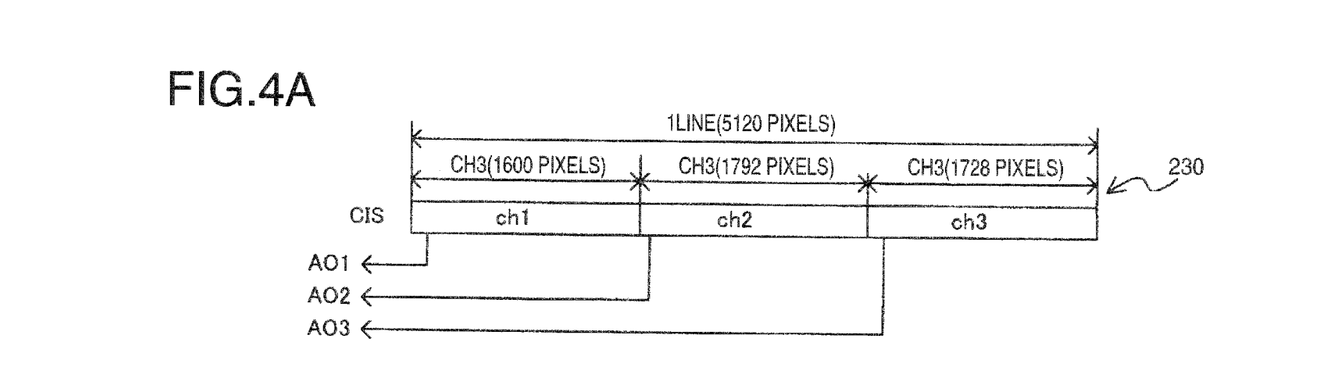
FIG. 4A schematically shows a configuration of a second-side CIS of the control system in the embodiment according to one or more aspects of the present invention.

Additionally, as schematically shown in FIG. 4A, the second-side CIS 230 has light receiving elements of a number corresponding to the number of pixels (e.g., 5120 pixels) of one line, which light receiving elements are divided into three channels ch1 to ch3. Each light receiving element receives light reflected by the document sheet while a light source (not shown) provided integrally with the second-side CIS 230 is emitting light, and stores electric charges corresponding to the received light. Then, in response to the second-side SP signal (SP_FS) being input, the stored electric charges are input to a known shift register (not shown).

Figure 4B:
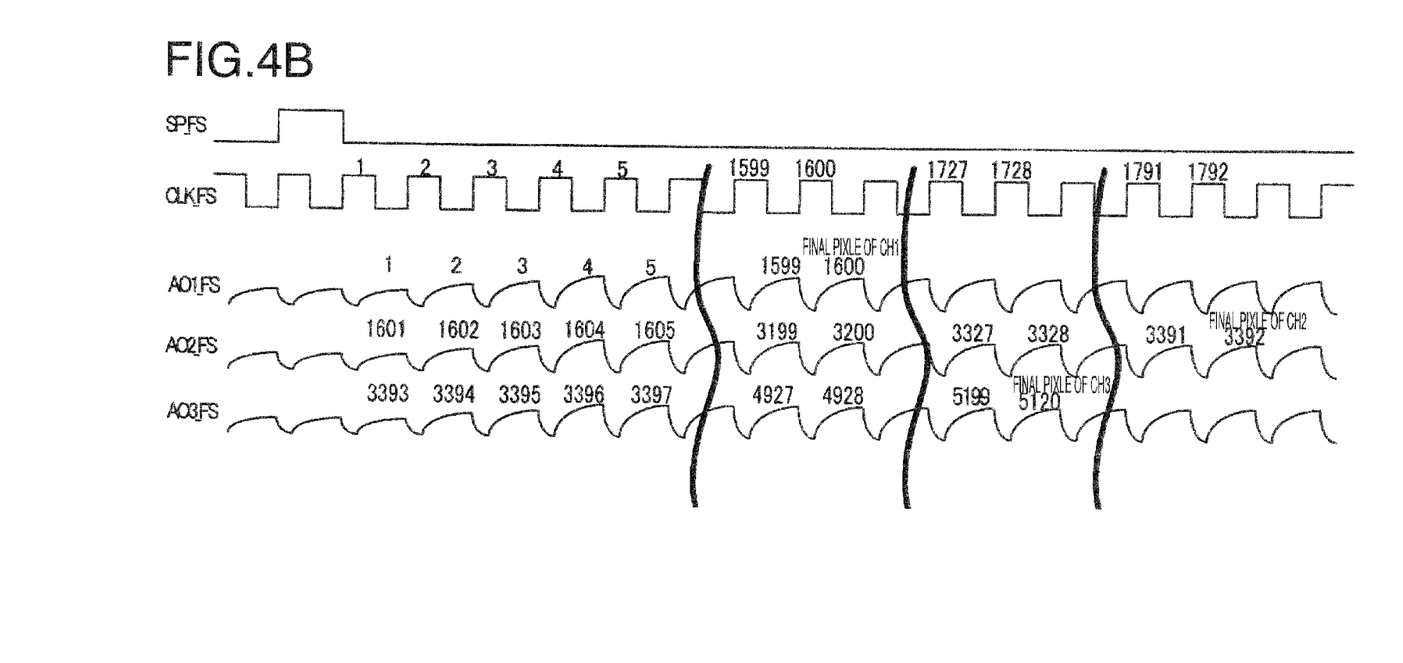
FIG. 4B is a chart of a signal transmitted via each terminal of the second-side CIS in the embodiment according to one or more aspects of the present invention.

Then, as illustrated in FIG. 4B, the shift register sequentially outputs the electric charges for each pixel, and the electric charges are output as the analog signals AO1_FS, AO2_FS, and AO3_FS, respectively from the channels ch1, ch2, and ch3, via elements such as an amplifier. Therefore, for instance, the analog signals AO1_FS corresponding to the first to 1600th pixels are output sequentially in order from the analog signal AO1_FS corresponding to the first pixel. Further, the analog signals AO2_FS corresponding to the 1601st to 3392nd pixels are output sequentially in order from the analog signal AO2_FS corresponding to the 1601st pixel. The analog signals AO3_FS corresponding to the 3393rd to 5120th pixels are output sequentially in order from the analog signal AO3_FS corresponding to the 3393rd pixel.

Referring back to FIG. 2, an ASIC 400 includes a first-side digital signal processor 401 configured to process signals concerning the first side of the document sheet and a second-side digital signal processor 403 configured to process signals concerning the second side of the document sheet. The digital signals DO_1 output from the first AFE 380 are input to the second-side digital signal processor 403 of the ASIC 400. The digital signals DO_2 output from the second AFE 390 are input to one of the second-side digital signal processor 403 and the first-side digital signal processor 401 of the ASIC 400, via a switching circuit 404, in the following manner.

The ASIC 400 further includes a timing generation circuit 405 that outputs the second-side SP signal (SP_FS), the second-side CLK signal (CLK_FS), the first-side SP signal (SP_BS), the first-side CLK signal (CLK_BS), the first A/D conversion main clock signal (MCLK for 1st AFE), the first sampling timing signal (VSMP for 1st AFE), the second A/D conversion main clock signal (MCLK for 2nd AFE), and the second sampling timing signal (VSMP for 2nd AFE). The switching circuit 404 receives, from the timing generation circuit 405, an output status of the timing generation circuit 405 with respect to each of the above signals. Thereby, the switching circuit 404 inputs signals concerning the second side among the digital signals DO_2 to the second-side digital signal processor 403, and inputs signals concerning the first side among the digital signals DO_2 to the first-side digital signal processor 401.

[Control by Control System]

Thus, in the embodiment, the first AFE 380 acquires the analog values from the analog signals AO1_FS and AO2_FS, converts the analog values into the digital values, and outputs the digital values as the digital signals DO_1. Further, the second AFE 390 acquires the analog values from the analog signals AO3_FS and AO_BS, converts the analog values into the digital values, and outputs the digital values as the digital signals DO_2. Therefore, it is possible to enhance a speed in A/D conversion for the analog signals in the following manner.

Figure 5A:
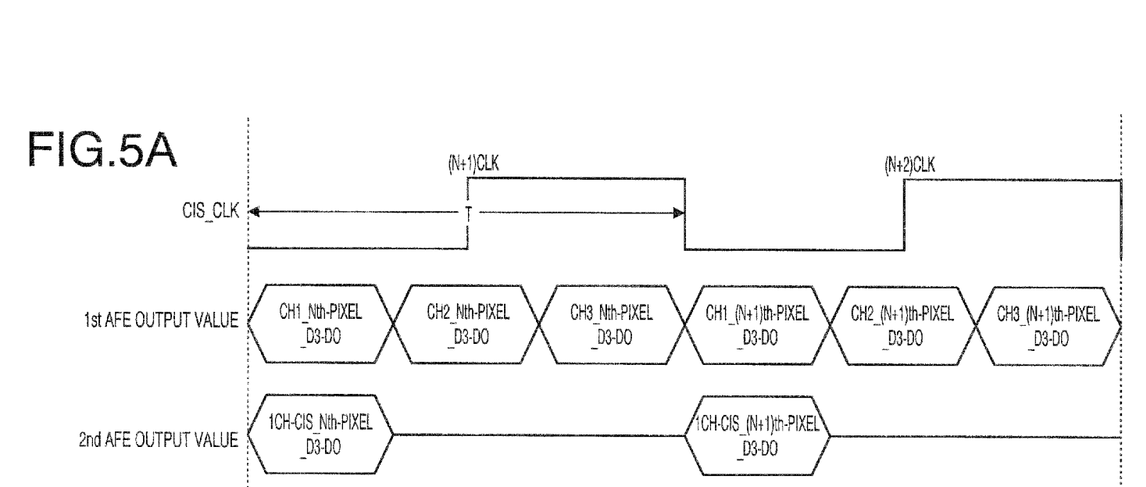
FIG. 5A shows charts of signals output from AFEs of a control system in a comparison example.

FIG. 5A shows charts of signals output from AFEs in a comparison example to set forth effects of the embodiment. In the comparison example, it is assumed that a three-channel first AFE (not shown), which has three couples of sample/hold circuits 381 and programmable gain amplifiers 383, converts three-channel analog signals AO1_FS, AO2_FS, and AO3_FS that are output from the second-side CIS 230, into digital signals (1st AFE output values). Further, it is assumed that a one-channel second AFE (not shown), which has one couple of a sample/hold circuit 381 and a programmable gain amplifier 383, converts one-channel analog signal AO_BS output from the first-side CIS 210, into a digital signal (2nd AFE output value).

In this case, even though the second AFE completely outputs one pixel of digital signal (1CH-CIS_Nth-PIXEL) corresponding to the analog signal AO_BS, the second AFE has to wait in a standby state until the first AFE completely outputs one pixel of digital signal (CH1_Nth-PIXEL) corresponding the analog signal AO1_FS, one pixel of digital signal (CH2_Nth-PIXEL) corresponding the analog signal AO2_FS, and one pixel of digital signal (CH3_Nth-PIXEL) corresponding the analog signal AO3_FS. Therefore, a one-pixel period T taken for A/D conversion for one pixel of the analog signal from each channel (i.e, AO1_FS, AO2_FS, AO3_FS, and AO_BS) is as long as shown in FIG. 5A.

Figure 5B:
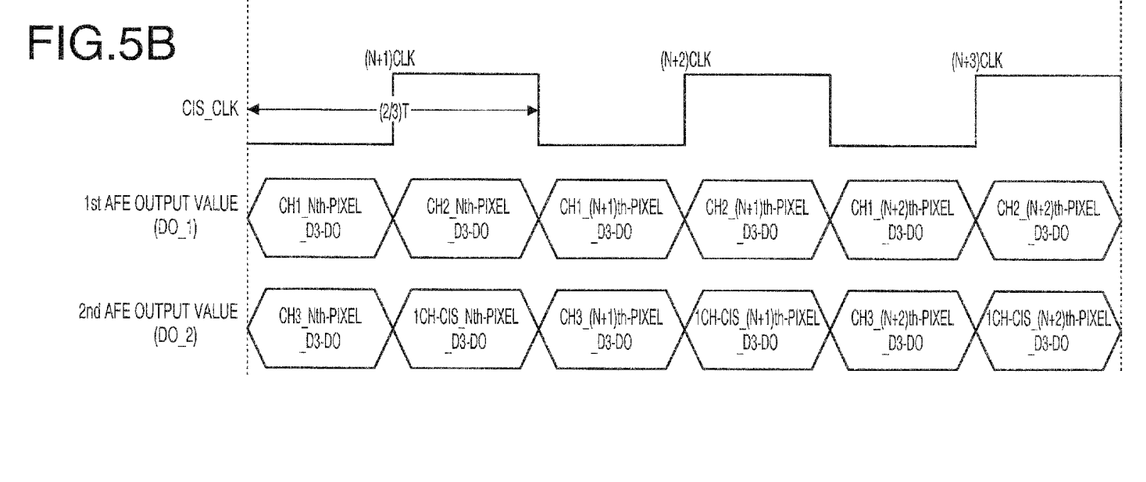
FIG. 5B shows charts of signals output from the AFEs of the control system in the embodiment according to one or more aspects of the present invention.

On the contrary, in the embodiment, the first AFE 380 acquires the analog values from the analog signals AO1_FS and AO2_FS, converts the analog values into the digital values, and outputs the digital values as the digital signals DO_1. Further, the first AFE 380 acquires the analog values from the analog signals AO3_FS and AO_BS, converts the analog values into the digital values, and outputs the digital values as the digital signals DO_2. Therefore, as shown in FIG. 5B, a time period taken for the first AFE 380 to completely output one pixel of digital signal (CH1_Nth-PIXEL) corresponding to the analog signal AO1_FS and one pixel of digital signal (CH2_Nth-PIXEL) corresponding to the analog signal AO2_FS is nearly equal to a time period taken for the second AFE 390 to completely output one pixel of digital signal (CH3_Nth-PIXEL) corresponding to the analog signal AO3_FS and one pixel of digital signal (1CH-CIS_Nth-PIXEL) corresponding to the analog signal AO_BS. Thus, a one-pixel period of the embodiment taken for A/D conversion for one pixel of the analog signal from each channel (i.e, AO1_FS, AO2_FS, AO3_FS, and AO_BS) is about two thirds as long as the aforementioned one-pixel period T of the comparison example.

Namely, according to the image reader 10 of the embodiment, it is possible to enhance the speed of A/D conversion for the analog signals AO1_FS, AO2_FS, AO3_FS, and AO_BS, and to make the one-pixel period about two thirds as long as the one-pixel period T of the comparison example. Accordingly, in the embodiment, it is possible to make a period of the clock CIS_CLK (which is used for processing by the second-side digital signal processor 403 and the first-side digital signal processor 401) about two thirds as long as that in the comparison example. Thus, it is possible to perform a rapid reading operation while reducing radiation noises.

Further, in the embodiment, when the image on only the second side of the document sheet being conveyed by the feeding unit 100 is read with the second-side CIS 230, or when the image on only a single side of a document sheet is read with the second-side CIS 230 being moved in the auxiliary scanning direction by the motor 351, the following control is taken. It is noted that such a so-called single-side reading mode is set through an operation panel (not shown) based on a detection status of the F sensor 310. In this case, there is not data as indicated with "AI2_2" in FIG. 3B or data as indicated with "1CH-CIS_Nth-PIXEL" in FIG. 5B. Further, in this case as well, as is understood from comparison with the digital signals indicated with "1st AFE output values" in FIG. 5B, it is possible to perform a rapid reading operation with a one-pixel period that is two thirds as long as that in the comparison example.

Further, when the number of the pixels (i.e., the number of the light receiving elements) of the three-channel second-side CIS 230 is equal to the number of the pixels of the one-channel first-side CIS 210, the pixels corresponding to the analog signal AO_BS are three times as many as the pixels corresponding to the analog signal AO1_FS, AO2_FS, or AO3_FS. Therefore, before A/D conversion is completely performed for all the pixels corresponding to the analog signal AO_BS, A/D conversion is completely performed for all the pixels corresponding to each of the analog signals AO1_FS, AO2_FS, and AO3_FS. After A/D conversion is completely performed for all the pixels corresponding to each of the analog signals AO1_FS, AO2_FS, and AO3_FS, NUL data is output as the digital signals (CH1_Nth-PIXEL, CH2_Nth-PIXEL, and CH3_Nth-PIXEL) corresponding to the analog signals AO1_FS, AO2_FS, and AO3_FS.

It is noted that the second-side CIS 230 may have more pixels than the first-side CIS 210. As described above, the second-side CIS 230 is configured to perform any of an ADF reading operation to read the image on the second side of the document sheet while statically staying in the position corresponding to the downstream reading position and a flatbed (FB) reading operation to read the image on a single side of the document sheet while moving in the auxiliary scanning direction under the document table 21. In the FB reading operation, it is possible to perform reading of a larger document sheet and reading with a higher accuracy, in comparison with the ADF reading operation. Thus, when the second-side CIS 230 has more pixels than the first-side CIS 210, it is possible to exert the advantages of the FB reading operation in a more preferable fashion.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

[Modifications]

The number of the channel(s) of the first-side CIS 210 or the second-side CIS 230 is not limited to the number exemplified in the aforementioned embodiment. For instance, the first-side CIS 210 may have four channels, and the second-side CIS 230 may have six channels. In such a case, three channels of the analog signals output from the second-side CIS 230 may be input to each of the AFEs 380 and 390, and two channels of the analog signals output from the first-side CIS 210 may be input to each of the AFEs 380 and 390.

What is claimed is:

1. An image reader comprising:
   a first image reading unit comprising a plurality of first light receiving elements, the first image reading unit being configured to output analog signals output from the plurality of first light receiving elements, via at least one channel for the first image reading unit;
   a second image reading unit comprising a plurality of second light receiving elements, the second image reading unit being configured to output analog signals output from the plurality of second light receiving elements, via a plurality of channels for the second image reading unit;
   an analog front end unit connected with the at least one channel for the first image reading unit and at least one channel of the plurality of channels for the second image reading unit, the analog front end unit being configured to perform A/D conversion for the analog signals output via the at least one channel for the first image reading unit and analog signals output via the at least one channel for the second image reading unit;
   a switching circuit connected with the analog front end unit, the switching circuit configured to receive digital signals output from the analog front end unit;
   a first digital signal processor connected with the switching circuit, and the first digital signal processor configured to process input digital signals; and
   a second digital signal processor connected with the switching circuit, and the second digital signal processor configured to process input digital signals,
   wherein the switching circuit is configured to switch an output destination by:
      outputting, to the first digital signal processor, digital signals generated from analog signals output from the first image reading unit; and
      outputting, to the second digital signal processor, digital signals generated from analog signals output from the second image reading unit.

2. The image reader according to claim 1, further comprising a timing generation circuit,
   wherein the switching circuit is configured to switch the output destination based on a signal output from the timing generation circuit.

3. The image reader according to claim 2,
   wherein the analog front end unit is configured to sequentially perform A/D conversion for an analog signal output from each first light receiving element assigned to the at least one channel for the first image reading unit and an analog signal output from each second light receiving element assigned to the at least one channel for the second image reading unit.

4. The image reader according to claim 3,
   wherein the analog front end unit is configured to alternately output, to the switching circuit, a digital signal generated from the analog signal output from each first light receiving element assigned to the at least one channel for the first image reading unit and a digital signal generated from the analog signal output from each second light receiving element assigned to the at least one channel for the second image reading unit.

5. An image reader comprising:
   a first image reading unit comprising a plurality of first light receiving elements, the first image reading unit being configured to output analog signals output from the plurality of first light receiving elements, via at least one channel for the first image reading unit;
   a second image reading unit comprising a plurality of second light receiving elements, the second image reading unit being configured to output analog signals output from the plurality of second light receiving elements, via a plurality of channels for the second image reading unit;
   an analog front end unit simultaneously connected with the at least one channel for the first image reading unit and at least one channel of the plurality of channels for the second image reading unit, the analog front end unit being configured to perform A/D conversion for the analog signals output via the at least one channel for the first image reading unit and analog signals output via the at least one channel for the second image reading unit; and
   a different analog front end unit connected with two or more remaining channels, other than the at least one channel connected with the analog front end unit, of the plurality of channels for the second image reading unit, the different analog front end unit being configured to perform A/D conversion for analog signals output via the two or more remaining channels for the second image reading unit.

6. The image reader according to claim 5, further comprising:
   a switching circuit connected with the analog front end unit, the switching circuit configured to receive digital signals output from the analog front end unit:
   a first digital signal processor connected with the switching circuit; and
   a second digital signal processor connected with the switching circuit and the different analog front end unit,
   wherein the switching circuit is configured to switch an output destination by:
      outputting, to the first digital signal processor, digital signals generated from analog signals output from the first image reading unit; and
      outputting, to the second digital signal processor, digital signals generated from analog signals output from the second image reading unit, and
   wherein the second digital signal processor is configured to process digital signals output from the different analog front end unit and digital signals output from the switching circuit.

7. The image reader according to claim 5, further comprising a timing generation circuit,
   wherein the switching circuit is configured to switch the output destination based on a signal output from the timing generation circuit.

8. The image reader according to claim 5,
wherein the analog front end unit is configured to sequentially perform A/D conversion for an analog signal output from each first light receiving element assigned to the at least one channel for the first image reading unit and an analog signal output from each second light receiving element assigned to the at least one channel for the second image reading unit, and
wherein the different analog front end unit is configured to sequentially perform A/D conversion for an analog signal output via each of the two or more different channels for the second image reading unit.

9. The image reader according to claim 5,
wherein the analog front end unit is configured to alternately output, to the switching circuit, a digital signal generated from the analog signal output from each first light receiving element assigned to the at least one channel for the first image reading unit and a digital signal generated from the analog signal output from each second light receiving element assigned to the at least one channel for the second image reading unit, and
wherein the different analog front end unit is configured to sequentially output, to the second digital signal processor, a digital signal generated from the analog signal output via each of the two or more different channels for the second image reading unit.

* * * * *